Jan. 17, 1939.   S. O. STAGEBERG   2,144,089
CLUTCH
Filed Nov. 12, 1934   4 Sheets-Sheet 1

Jan. 17, 1939.  S. O. STAGEBERG  2,144,089
CLUTCH
Filed Nov. 12, 1934  4 Sheets-Sheet 2

Inventor
Sterling O. Stageberg
By Caswell & Lagaard
Attorneys

Jan. 17, 1939.   S. O. STAGEBERG   2,144,089
CLUTCH
Filed Nov. 12, 1934    4 Sheets-Sheet 4

Inventor
Sterling O. Stageberg
By Caswell & Lagaard
Attorneys

Patented Jan. 17, 1939

2,144,089

UNITED STATES PATENT OFFICE 2,144,089

CLUTCH

Sterling O. Stageberg, Red Wing, Minn., assignor to Sterling Engineering, Inc., Red Wing, Minn., a corporation of Minnesota Application November 12, 1934, Serial No. 752,585

25 Claims. (Cl. 192—58)

My invention relates to clutches and particularly to clutches operated through fluid pressure and has for an object to provide an extremely practical and efficient clutch whereby maximum efficiency is procured with minimum effort.

An object of the invention resides in providing a clutch in which oil or some similar liquid is used which serves as a medium for affording a connection between a driving and driven part.

Another object of the invention resides in providing a clutch in which engagement of the parts is procured gradually and entirely automatically.

An object of the invention resides in providing a clutch in which free wheeling may be procured by the use of fluid-operated means and without mechanical transmission mechanism.

A still further object of the invention resides in providing a clutch in which motor braking may be instantly procured regardless of the speed of the engine or vehicle or the disposition of the clutch parts.

A feature of the invention resides in providing a clutch in which the driven member becomes quickly disengaged from the driving member when the occasion arises.

A still further object of the invention resides in providing a clutch in which disengagement of the driven member from the driving member may be accomplished through the operation of a pedal or other manually controlled movable member.

A feature of the invention resides in providing auxiliary clutch mechanism adapted to be used when starting the engine without the use of the starting motor.

Other objects of the invention reside in the novel combination and arrangement of parts and in the details of construction hereinafter illustrated and/or described.

Figure 1:
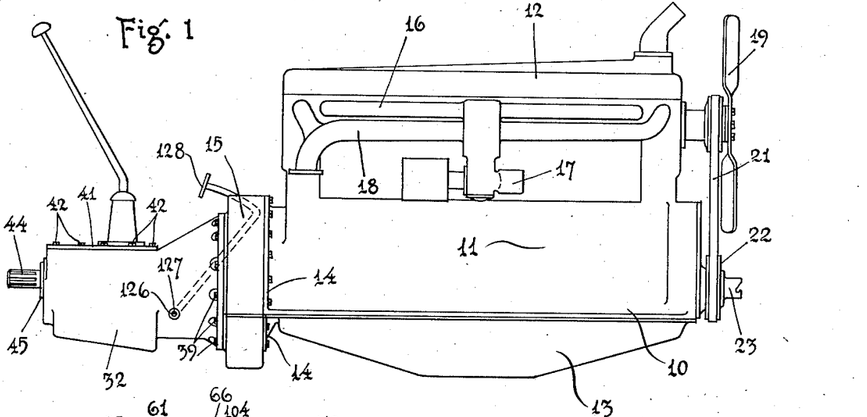
Fig. 1 is an elevational view of an internal combustion engine showing the application of my invention thereto.
Figures 2, 5:
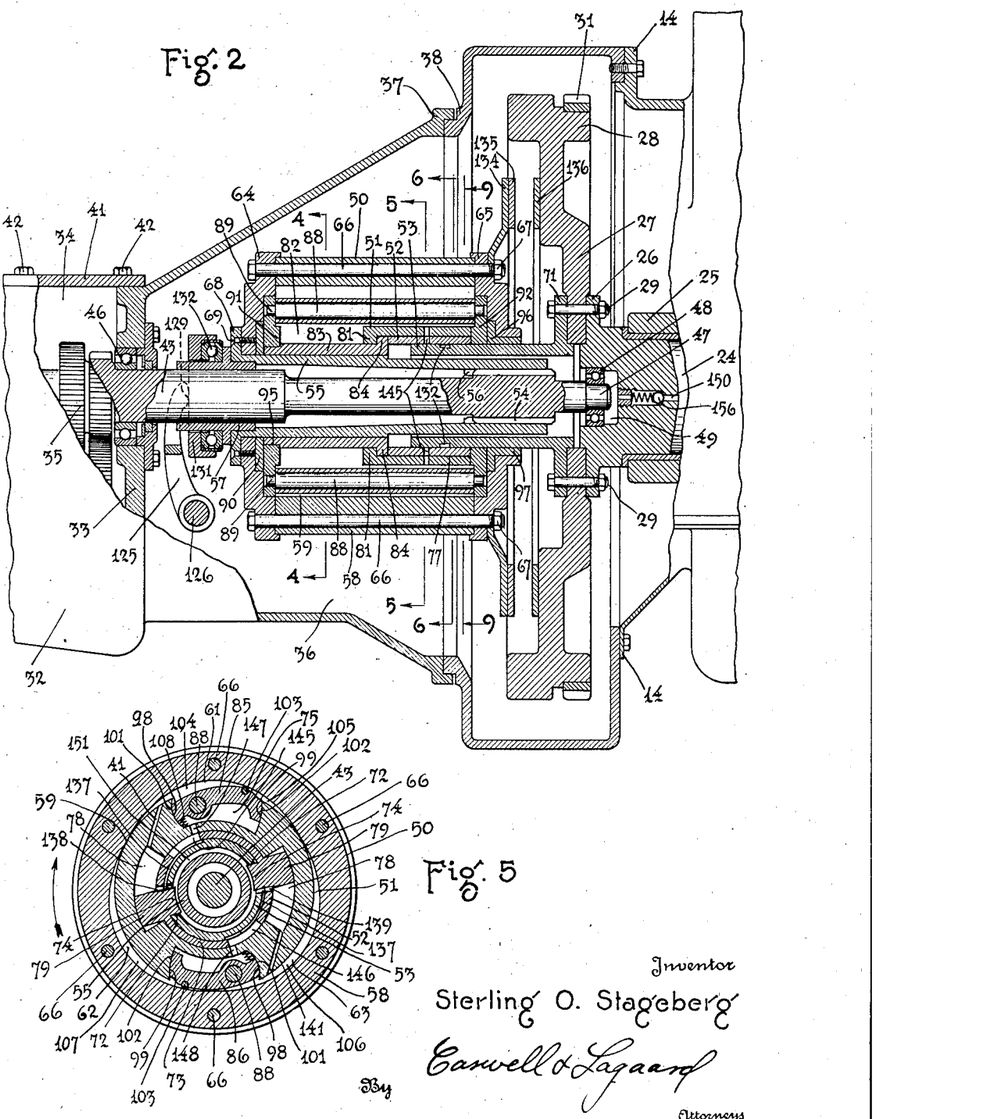
Fig. 2 is an elevational sectional view of the transmission mechanism shown in Fig. 1 and drawn to a larger scale, said view illustrating the parts in normal driving position.
Fig. 5 is another cross sectional view of the clutch mechanism taken on line 5—5 of Fig. 2.
Figures 3, 4:
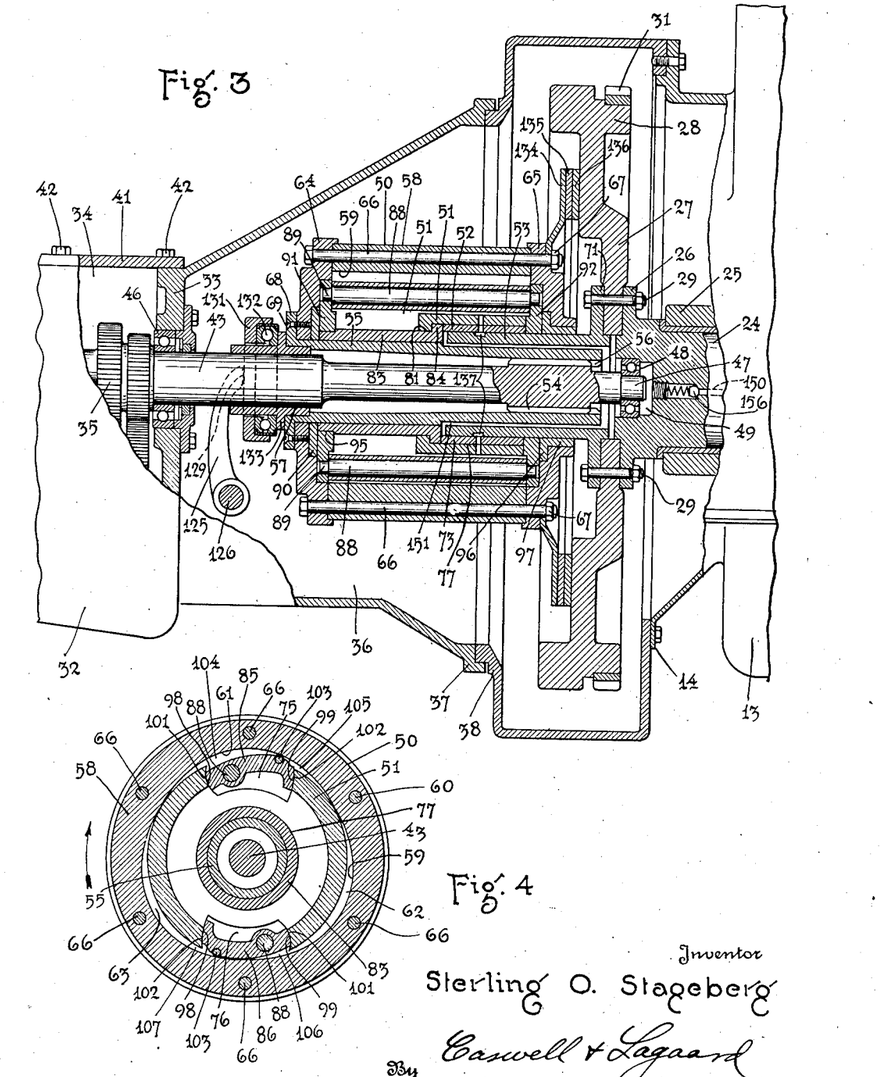
Fig. 3 is a view similar to Fig. 2 showing the parts in altered position.
Fig. 4 is a transverse cross sectional view of the clutch mechanism taken on line 4—4 of Fig. 2.

For the purpose of illustrating the application of my invention, I have shown in Figs. 1, 2 and 3 an internal combustion engine which is indicated in its entirety by the reference numeral 10. Inasmuch as the invention concerns itself only with the clutch by means of which said engine may be connected to the driven shaft the major portion of the engine has not been shown in detail. The part of the engine shown includes a cylinder block 11 which has attached to it a cylinder head 12. The lower portion of the cylinder block 11 is provided with a crank case 13. On the crank case 13 and the cylinder block 11 are formed flanges 14 which have bolted to them a fly wheel housing 15. The engine includes an intake manifold 16 provided with fuel mixture by a carburetor 17, an exhaust manifold 18 and a fan 19 driven through a belt 21 from a pulley 22 secured to the forwardly protruding end 23 of the crank shaft 24. The engine 10 further includes all the other necessary parts such as cylinders, pistons, connecting rods and the usual ignition system by means of which the engine may be operated in the customary manner. Inasmuch as these parts of the engine do not form any particular feature of the invention, the same have not been illustrated or described.

The crank shaft 24 is journaled in a bearing 25 in the engine as well as in other bearings not shown, and is constructed at its rear end with an outwardly extending flange 26. To this flange is secured the web 27 of a fly wheel 28 which is bolted thereto by means of bolts 29. Fly wheel 28 is contained within the housing 15 and may be provided with a gear 31 by means of which the engine is started in the customary manner. The housing 15 has attached to it a transmission housing 32 which is constructed with a division wall 33 dividing the said housing into a compartment 34 for the reception of suitable gear transmission 35 and another compartment 36 in which the clutch constituting my invention is disposed. The housing 32 is open at the forward end thereof and is so designed to permit of the insertion of the same over the clutch mechanism, and is constructed with a flange 37 which is seated against a corresponding flange 38 formed on the fly wheel housing 15. These two parts are bolted together through bolts 39 and when it becomes desirable to gain access to the clutch, the housing 32 is removed by unscrewing the said bolts. The portion of the housing 32 forming the compartment 34 is open at the top and is closed through a cover 41 by means of which access to the interior of the said housing may be had. This cover is attached to the housing by bolts 42. The transmission 35 includes a propeller shaft 44 which constitutes the member driven by the clutch. The shaft 24 of the engine 10, as will be presently more fully described, constitutes the member for driving the clutch. Shaft 44 is connected to a universal joint and thereby connected through other transmission mechanism, not shown, to the rear driving wheels of the motor vehicle on which the engine is installed. The shaft 44 is journaled in a bearing 45 formed in the housing 32 as shown in Fig. 1 and is driven through the transmission gearing 35 from another shaft 43 which is journaled in a bearing 46 mounted in the division wall 33 of the housing 32. The shaft 43 extends throughout the compartment 36 and is constructed at its extreme forward end with a reduced portion 47. This reduced portion is journaled in a bearing 48 mounted in a socket 49 in the end of the crank shaft 24. This bearing serves as a pilot bearing for maintaining the crank shaft 24 and the driven shaft 43 in alignment.

The clutch proper consists of a case 50 which is fixed relative to the shaft 43. Within this case is mounted a rotor 51 which rotor is rotated through a driving member 52. Driving member 52 is in turn driven from a sleeve 53 which is connected to the fly wheel 26. These various parts will now be described in detail.

The shaft 43 is formed at its forward end with a spline 54. A tubular shaft 55 encircles the shaft 43 and is itself constructed with splines 56 which cooperate with the splines 54 to effect a drive between shaft 43 and shaft 55. The shaft 55 is somewhat larger in diameter than the shaft 43 to receive the same and is supported at its front end by the splines 56. The other end of the shaft 55 is mounted upon a bushing 57 which encircles the said shaft 43 and rotates and slides thereon.

The case 50 consists of a cylindrical barrel 58 which is formed with a bore 59 of irregular cross section. The bore 59 is constructed with three recesses 61, 62 and 63 which in conjunction with the rotor 51 form chambers in which expansion and compression of the fluid occurs. The bore 59 is so constructed that all diameters of the same are equal which serves a function which will presently become readily apparent. The barrel 58 has attached to it two end bells 64 and 65. This is accomplished by means of a number of bolts 66 which pass longitudinally through the said barrel and end bells and which have nuts 67 screwed upon the ends thereof. The end bell 64 is secured to an outwardly extending flange 68 formed on the tubular shaft 55 which is accomplished through machine screws 69 passing through said flange and threaded into said end bell. By means of this construction the case 50 is centered at its rear end relative to the shaft 43 and is directly secured to the tubular shaft 55. Due to the fact that the shaft 55 is splined to the shaft 43 it will become readily apparent that the entire case 50 may be slid longitudinally along the shaft 43 for a purpose to be presently more fully described.

The sleeve 53 encircles the forward end of the tubular shaft 55 and is of such dimensions as to be completely free from the same. This sleeve is constructed with an outwardly extending flange 71 which is bolted to the fly wheel 27 through the bolts 29 used for securing the fly wheel to the crank shaft 24. The sleeve 53 is constructed with two longitudinally extending slots 72 which serve to drive the driving member 52 as will be presently described in detail. These slots open at the rearward end of the sleeve and extend partly along the length thereof, being diametrically opposed.

The driving member 52 consists of a tubular portion 73 which receives the sleeve 53, said driving member fitting snugly upon the sleeve. This driving member is constructed with two inwardly extending keys 74 which are adapted to engage within the slots 72 and afford a drive between the sleeve 53 and said driving member. This construction permits of sliding movement of the said driving member with respect to the sleeve 53.

Figures 9, 10, 11:
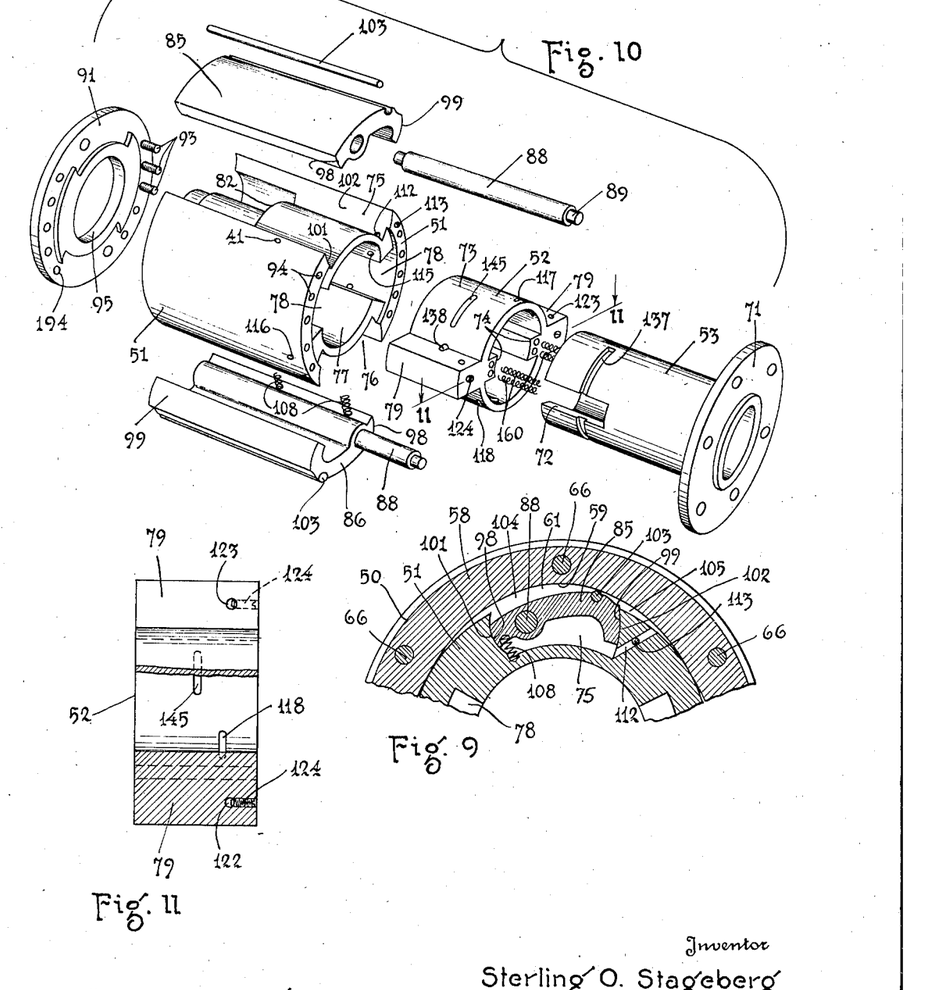
Fig. 9 is a fragmentary cross sectional view taken on line 9—9 of Fig. 2 and drawn to a larger scale.
Fig. 10 is a perspective view of the parts of the rotor driving member and sleeve of the invention.
Fig. 11 is a longitudinal detail sectional view taken on line 11—11 of Fig. 10.

The rotor 51 is cylindrical in form as shown in Fig. 10 and is recessed at diametrically opposed localities in the periphery thereof to provide two diametrically opposed pockets 75 and 76. The inner portion of the rotor is constructed with a bore 77 which receives the tubular portion 73 of the driving member 52. These parts fit snugly together. In the interior of the rotor 51 are formed two longitudinally extending grooves 78 which are adapted to receive two keys 79 formed on the tubular portion 73 of the driving member 52 and extending outwardly therefrom and longitudinally with respect thereto. These grooves have considerably greater circumferential extent than the thickness of the keys 79 so that the driving member 52 may rotate a predetermined amount with respect to the rotor 51. The rearward end of the body of the rotor 51 between the two pockets 75 and 76 is cut away as indicated at 82 to bring the two pockets 75 and 76 into communication with one another. The rotor 51 is supported at one end upon the tubular portion 73 of driving member 52 which in turn is supported upon the sleeve 53. The other end of the rotor 51 has attached to it a bearing 83 which is constructed with a flange 84 butting against an inwardly directed flange 81 formed on said rotor. This bearing receives the tubular shaft 55 and journals the rotor with respect to said shaft. The driving member 52 is considerably shorter in length than the rotor 51 and to hold the same from longitudinal movement in one direction the outwardly turned flange 84 formed on bearing 83 is used which engages the rearward end of the tubular portion 73 of said driving member. Bearing 83 is pressed into the bore 77 of the rotor 51 and is supported at its rearward end as will be presently described.

Within the two pockets 75 and 76 of rotor 51 are disposed two gates 85 and 86. These gates are arcuate as shown and are pivoted on spindles 88 which pass completely through the same. The spindles 88 are constructed at their ends with reduced portions 89 which are received in end plates 91 and 92, one of which is shown in Fig. 10, and which are attached to the rotor 51. The gates 85 and 86 are further constructed with arcuate ends 98 and 99 which are concentric with the centers of the spindles 88. These ends ride against arcuate surfaces 101 and 102 formed in the rotor 51 and forming part of the walls of the said pockets 75 and 76. In the outer surfaces of the gates 85 and 86 are inserted wear resisting shoes 103 which are adapted to contact with the inner surfaces of the bore 59 of barrel 58 or to be moved radially inwardly therefrom as will be later more fully described. By means of this construction two chambers 104 and 105 are formed opposite pocket 75 and two chambers 106 and 107 are formed opposite pocket 76. The four chambers 104, 105 and 106, 107 are adapted to successively communicate with the lobes 61, 62 and 63 of the bore 59 of barrel 58 and form in conjunction therewith the expansible chambers of the clutch in which expansion and compression of the fluid takes place. When the engine is driving the vehicle, chambers 105 and 107 constitute high pressure chambers and chambers 104 and 106 constitute low pressure chambers. When relative movement of the parts is reversed, the high pressure chambers and low pressure chambers are also reversed. The two pockets 75 and 76 are at all times in communication with one another through the cut away construction of the rotor designated by the reference numeral 82.

The end plates 91 and 92 fit up against the ends of the rotor 51 and are secured thereto through a number of machine screws 93 which pass through holes 194 in said end plates and are screwed into threaded openings 94 in the end of the rotor. The end plate 91 is constructed with a bore 95 which receives the end of the bearing 83 and centers and supports the rearward end of the same. The rotor 51 fits snugly within the bore 59 of case 50, the end plates 91 and 92 traveling in close proximity to the end bells 64 and 65. To prevent wear on these parts a facing 90 is set into the end bell 64 and against which the end plate 91 abuts. A similar facing 96 is set into the end bell 65 and serves a like purpose. This facing, however, has attached to it a bushing 97 which forms a bearing for journalling the forward end of the case on the sleeve 53.

The rotor 51 is driven from the crank shaft 24 through the agency of the sleeve 53 and the driving member 52. Normally the gates 85 and 86 are held out of engagement with the bore 59 through two compression coil springs 108 which are seated against the said gates and rotor proper as best shown in Fig. 9. In such positions chambers 104 and 105 are in communication and merge with one another and likewise chambers 106 and 107. This being the case no pressure is created in any of these chambers. When the engine is accelerated centrifugal force throws the gates radially outwardly swinging the same upon the spindles 88. This brings the shoes 103 into engagement with the inner surface of the bore 59 of the barrel 58 causing the chambers 104 and 105 to become separated from one another, and likewise chambers 106 and 107. As soon as sufficient contact is established between the shoes 103 and the wall of bore 59, pressure is built up in the chambers 105 and 107. As the rotor continues to rotate the shoes 103 follow the surface of the bore 59 and a variable leakage action past the ends of the gates takes place. Due to the fact that centrifugal force alone is relied on at this stage to maintain contact between the shoes and the case, at first most of the fluid leaks past the shoes from the chamber 105 to the chamber 104 and from the chamber 107 to the chamber 106. In the rotor 51 are provided holes 112, Fig. 9, which bring the chambers 105 and 107 into communication with the pockets 75 and 76. When the pressure builds up in these pockets a force is exerted upon the inner surface of the shoes 85 and 86. As such pressure is increased leakage past the shoes 103 is reduced. Reducing the leakage causes the further building up of pressure and increasing pressure causes less leakage. In this manner the pressure gradually builds up and the leakage gradually decreases. As the leakage decreases the relative travel of the rotor 51 with respect to the case 50 is reduced and when maximum pressure is reached the parts are held locked and no movement occurs. As previously stated, all diameters of the bore 59 are equal. This causes the combined volume of the pockets 75 and 76 together with the volume of the connecting part 82 to remain constant regardless of the position of the rotor with respect to the case. The pressure in said pockets hence is unaffected by the movement of gates 85 and 86 in following the irregular surface of bore 59. It will hence be readily comprehended that gradual engagement of the clutch is procured which gives uniform acceleration to the vehicle driven by the engine. For controlling the rate of engagement adjusting screws 113 are employed which are partly screwed into the passageways 112 and serve to constrict the flow of fluid through the same. The position of the parts in normal operation is shown in Fig. 2.

In order to cause the device to free wheel it becomes necessary that the chamber 105 be rapidly brought into communication with pocket 75 and likewise chamber 107 brought into communication with pocket 76. This is accomplished through the action of the driving member 52 which also operates in conjunction with the rotor 51 to form a valve mechanism for controlling the flow of the fluid as described.

Figures 6, 7, 8:
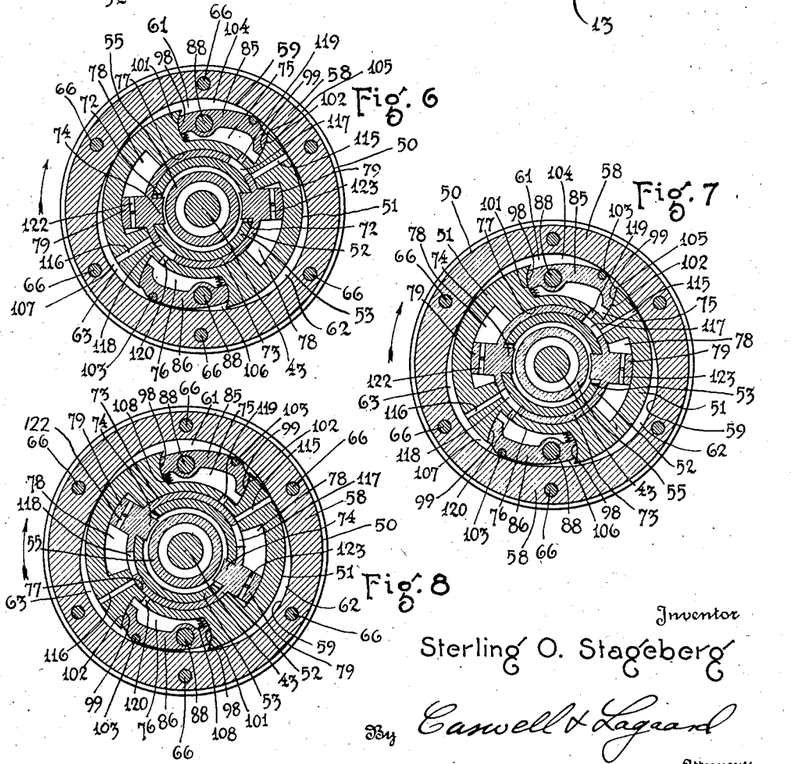
Fig. 6 is a cross sectional view of the clutch taken on line 6—6 of Fig. 2.
Figs. 7 and 8 are cross sectional views similar to Fig. 6 and showing the parts in altered position.

The particular construction by means of which this result is accomplished is best shown in Figs. 6, 7 and 8. In the rotor 51 in advance of the shoes 103 are formed two passageways 115 and 116 which bring the chambers 105 and 107 into communication with the chamber formed by the bore 77 of rotor 51. These two passageways are adapted to communicate with ports 117 and 118 formed in the tubular portion 73 of the driving member 52, also illustrated in Fig. 10. The rotor 51 further has two other passageways 119 and 120 which bring the pockets 75 and 76 into communication with the chamber formed by the bore 77 of said rotor. These passageways also are adapted to communicate with the ports 117 and 118. When the engine is driving the vehicle the same is accomplished through the driving member 52 and the two keys 79 which at such time occupy the positions shown in Fig. 8. It will be noted that the passageways 115, 116, 119 and 120 are out of communication with the ports 117 and 118, when the parts are arranged in this position. As soon as the foot is raised from the accelerator pedal the engine slows down and a reversal of relative movement between the rotor and case occurs which moves the parts to the position shown in Fig. 7. Reversal of movement of the rotor with respect to the case causes the chamber 104 to become a pressure chamber and the chamber 105 to become a suction chamber. The pressure built up in the pocket 75 hence is released through the passageway 119, port 117 and passageway 115 back to the suction chamber 105. Likewise the pressure in pocket 76 is released through the passageway 120, port 118 and passageway 116. This permits the two springs 108 to urge the gates 85 and 86 away from the bore 59 of the barrel 58 and the gates collapse, whereupon the clutch becomes released. This continues so long as the engine is idling and the centrifugal force acting upon the two gates 85 and 86 is not sufficient to throw the gates outwardly into positive engagement with the bore of the case. After the pressure in the two pockets 75 and 76 has been released the driving member 52 travels until it occupies the position shown in Fig. 6, in which position communication between the said pockets and the chambers 105 and 107 is again closed off. In such position the parts may free wheel. While free wheeling the gates may be in proximity to the surface of the case or retracted therefrom, depending upon the speed of the vehicle. Only when the parts carrying the gates ceases to rotate will the gates become fully retracted. Fig. 6 shows the parts while centrifugal force is sufficient to move the gates outwardly. Since reversal of pressure now results, the pressure chambers 104 and 106 break the seal between the juxtaposed chambers so that free wheeling may occur regardless of the speed of the vehicle.

In order to time the releasing action of the clutch, the pump action afforded through the two keys 79 operating in the two grooves 78 is utilized. Adjustable leakage passageways 122 and 123 are formed in these keys which are controlled through adjusting screws 124. This construction provides constricted passageways which serve to time the movement of the parts and to cause the proper functioning of the mechanism in the releasing of the clutch.

In order to procure pedal disengagement of the clutch and motor braking the entire case 50 is slidable relative to the shaft 43 and certain ports are provided in the sleeve 53, the driving member 52 and the rotor 51 which will be subsequently described and which accomplishes the desired result when sufficient sliding action takes place. The case 50 is adapted to be moved through the action of a forked arm 125 which is secured to a shaft 126. Shaft 126 is journaled in suitable bearings 127 formed in the housing 32 and has attached to it a pedal 128 by means of which the same may be operated. The forked arm 125 is formed at its end with fingers 129 which are adapted to engage a collar 131 encircling the bushing 57. An end thrust ball bearing 132 mounted on this bushing and acting between a flange 133 thereon and said collar takes up the end thrust afforded in the movement of the case 50 along the shaft 43. Case 50 is returned to normal position by means of coil springs 160 which are set into the ends of the keys 74 of driving member 52 and which engage the ends of the slots 72 of sleeve 53.

In order to start the engine through movement of the wheels of the vehicle a friction clutch is employed which is best shown in Figs. 2 and 3. A dished plate 134 is secured to the end bell 65 of case 50 through the bolts 66 used for holding said parts together. This plate has a friction facing 135 attached to it which is adapted to frictionally engage a similar friction facing 136 secured to the fly wheel 28. When the case is in the position shown in Fig. 2 the facings 135 and 136 are free from one another. When, however, the case 50 is moved forwardly as shown in Fig. 3, the two facings engage one another and a mechanical friction drive is effected between the fly wheel and the propeller shaft 44 of the motor vehicle.

Pedal disengagement of the clutch as previously stated is accomplished through movement of the case 50 toward the fly wheel 28. When sufficient movement has been procured two grooves 137 on the sleeve 53 best shown in Figs. 5 and 10 are brought into engagement with two ports 145 and 146 formed in the driving member 52. These ports are adapted to register with holes 147 and 148 which extend through the said rotor bringing the pockets 75 and 76 into communication with the bore 77 of the rotor. The holes 147 and 148 as well as the grooves 145 and 146 are disposed at different axial positions from the corresponding grooves 117 and 118, and the holes 119 and 120, previously referred to so that no interference in operation is brought about, each set of ports functioning independently of the other. These grooves are adapted to communicate with two openings 138 and 139 in the tubular portion 73 of driving member 52, whereby the two chambers formed by the grooves 78 are brought into communication with the pockets 75 and 76. Two other passageways 41 and 141 lead from said grooves to the chambers 104 and 106 previously referred to. When the parts are in the position shown in Fig. 5, which is just before the friction facings 135 and 136 come in contact, flow of fluid from the pocket 75 occurs through passageway 147, port 145, groove 137, passageway 138, groove 78 and passageway 41 to the chamber 104. This releases the pressure in the pocket 75. In a similar manner the pressure in the pocket 76 is released and the two springs 108 cause the shoes 85 and 86 to collapse.

Motor braking may also be accomplished with my invention. If the pedal 128 is depressed to procure pedal disengagement and the engine speeded up, the shoes 85 and 86 are thrown outwardly through centrifugal force. Movement of the rotor and the case is in the same direction, but the rate of travel of the case being greater than that of the rotor, the relative movement of the rotor with respect to the case is now in the opposite direction and the pump action of the clutch is exactly opposite of what it was in the previous arrangement of the parts. Pressure is now built up in chambers 104 and 106. The fluid in the chamber 104 is transmitted through passageway 41, groove 78, hole 138, groove 137, port 145 and hole 147 into pocket 75. This increases the pressure in said pocket and forces the gate 85 outwardly. A small amount of oil leaks through to the other side through the leakage holes 112 as previously described, which determines the rate of engagement of the clutch. When sufficient pressure has been built up the two elements of the clutch become locked and braking through the engine is procured.

Oil is fed into clutch from the crank case of the engine. This is accomplished as follows: A duct 150 (Fig. 3) in the crank shaft 24 of the engine is in communication with the oil in the crank case 13. This duct leads into socket 49 from which the oil may flow through the bearing 48 and into the space 151, between the tubular shaft 55 and the sleeve 53. The keys 74 on driving member 52 are spaced from the walls of slots 72 in proximity to the openings 138 and 139 so that the oil passes freely into the bore of member 52 through the spaces afforded thereby. By means of the openings 138 and 139 the oil is conducted into grooves 78 and from said grooves into chambers 104 and 106 through passageways 41 and 141. As the clutch operates oil is fed into the suction chamber and passes through the clutch as previously described. A check valve 156 in the passageway 150 prevents return of oil to the crank case 13.

My invention is operated in the following manner: When the motor vehicle is stationary and the engine is idling, gates 85 and 86 are free from the case 50 and the rotor travels freely within said case. The transmission may then be shifted into low gear without pedal manipulation of the clutch. When the speed of the engine is accelerated through the foot pedal usually provided for the purpose, the shoes 85 and 86 are thrown outwardly through centrifugal force and clutch action is commenced. Clutch action then continues, the rate of engagement of the clutch being gradual and uniform. This procures uniform acceleration until the clutch has become locked. Thereafter the drive is the same as with any other type of clutch. The operation is repeated until the vehicle is in high gear. It will be noted that in order to throw out the clutch it is merely necessary to reduce the speed of the engine by removing the foot from the accelerator pedal and instantly the clutch gates 85 and 86 collapse and the engine becomes disconnected from the driving wheels. This permits of free wheeling but goes farther than free wheeling since the vehicle can come to a complete standstill. With my invention while in free wheeling, it is not necessary to throw out the clutch manually when the vehicle speed drops below that produced by the engine when running at idling speed. When it is desired to positively disengage the clutch for the purpose of starting the vehicle, the same is disengaged through partial depression of the pedal provided and the vehicle is then free from the engine. The engine may then be cranked through the starter and may be raced or speeded up if found necessary in the starting of the same without causing the vehicle to move. In the case of a run down battery where the user desires to crank his car through being pushed by another car it is merely necessary to force the pedal clear in until the auxiliary clutch engages. The engine would then be cranked in the customary manner. When the driver desires to procure motor braking it is merely necessary to press the pedal and accelerate the motor, whereupon the clutch action reverses and braking is effected. If at any time the clutch has been set for motor braking the operator desires to coast, it is merely necessary to release the pressure on the foot pedal. The oil in the chambers 75 and 76 then leaks back to the chamber 105 through leakage port 112. With the parts so disposed the driver may again procure clutching for propulsion by speeding up the engine as previously described.

My invention is highly effective in that it provides a clutch by means of which the starting of a vehicle from rest may be accomplished through the manipulation of a single lever, namely, the accelerator pedal. With my invention free wheeling can be instantly and positively procured without wear on any mechanical parts. In operating my invention it is unnecessary to disengage the clutch when the vehicle speed reduces after the vehicle is in free wheeling since the clutch is completely disconnected. With the auxiliary foot pedal all of the advantages can be procured which are present with the usual types of clutches. All of the parts of my invention travel in oil and the device will operate indefinitely and there will hence be no worn out parts to replace as in friction clutches, such as clutch linings or the like.

Changes in the specific form of my invention, as herein disclosed, may be made within the scope of what is claimed without departing from the spirit of my invention.

Having described my invention, what I claim as new and desire to protect by Letters Patent is:

1. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, and means forming a constricted passageway between said first named chamber and said pocket for subjecting said pocket to the pressure in said first named chamber to move the gate against said irregular surface.

2. In combination, a hollow member, a rotary member within said hollow member, one of said members having a regular surface of revolution concentric with the axis of rotation of said rotary member, and the other having an irregular surface partially contacting with and partially separated from said first named surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said gate having an extended surface facing away from said irregular surface, said member having the regular surface being formed with a radially opening pocket, and means forming a constricted passageway communicating with said first named chamber and said pocket for subjecting said gate to the pressure in said first named chamber to move the gate against said irregular surface.

3. In combination, a hollow member, a rotary member within said hollow member, one of said members having a regular surface of revolution concentric with the axis of rotation of said rotary member, and the other having an irregular surface partially contacting with and partially separated from said first named surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, and means forming a constricted passageway communicating with said first named chambers and said pocket for subjecting said gate to the pressure in said first named chamber to move the gate against said irregular surface, means forming a normally closed free passageway connecting said first named chamber with said pocket, and means operable through reversal of relative movement between said members for opening said passageway.

4. In combination, a hollow member, a rotary member within said hollow member, one of said members having a regular surface of revolution concentric with the axis of rotation of said rotary member, and the other having an irregular surface partially contacting with and partially separated from said first named surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a normally closed passageway communicating with said second named chamber and said pocket, and means operable through relative reversal of movement of said members for opening said passageway.

5. In combination, a hollow member, a rotary member within said hollow member, one of said members having a regular surface of revolution concentric with the axis of rotation of said rotary member, and the other having an irregular surface partially contacting with and partially separated from said first named surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said members having the regular surface being formed with a pocket into which said gate extends, means forming a constricted passageway communicating with said first named chambers and said pocket for subjecting said gate to the pressure in said first named chamber to move the gate against said irregular surface, means forming a normally closed passageway between said pocket and the second named chamber, and means for manually opening said passageway to bring the pocket into communication with said second named chamber.

6. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface when said members have relative movement in one direction, means forming a passageway communicating with said second named chamber and said pocket and means for closing said second named passageway.

7. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface when said members have relative movement in one direction, means forming a passageway communicating with said second named chamber and said pocket and manually controlled means for opening and closing said second named passageway.

8. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface, means forming an unrestricted bypass between said first named chamber and said pocket and means for closing said bypass.

9. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface, means forming an unrestricted bypass between said first named chamber and said pocket and means operated through relative movement of said members for controlling the flow through said bypass.

10. In combination, a hollow member, a rotary member within said hollow member, one of said members having a regular surface of revolution concentric with the axis of rotation of said rotary member, and the other having an irregular surface partially concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface, means forming an unrestricted bypass adapted to be closed when the relative movement of said members produces pressure in said first named chamber, and adapted to be open upon reversal of relative movement of said members.

11. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway between said first named chamber and said pocket for subjecting said gate to the pressure in said first named chamber to move the gate against said irregular surface, means forming an unrestricted passageway between said first named chamber and said pocket and a driving member for driving one of said members, said driving member having relative movement with respect thereto, and in one position closing said unobstructed passageway and in another position opening said passageway.

12. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway between said first named chamber and said pocket for subjecting said gate to the pressure in said first named chamber to move the gate against said irregular surface, means forming an unrestricted passageway between said first named chamber and said pocket, a driving member for driving one of said members, said driving member having limited rotational movement with respect to said member and when in one position closing said unobstructed passageway and when in another position opening said passageway.

13. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway connecting said chambers, said member having the regular surface being formed with a pocket into which said gate extends, means forming a constricted passageway between said first named chamber and said pocket for subjecting said gate to the pressure in said first named chamber to move the gate against said irregular surface, means forming a passageway between said second named chamber and pocket, and means having axial movement relative to the member formed with the pocket, and operating in one position to close said passageway and in another position to open said passageway.

14. In combination, a hollow member, a rotary member within said hollow member, one of said members having a regular surface concentric with the axis of rotation of said rotary member, and the other having an irregular surface contacting with the regular surface at equally spaced intervals and spaced therefrom between localities of contact to form similar recesses, a number of pockets in said member having the regular surface, gates movable in said pockets and adapted to follow said irregular surface to vary the volume of the pockets between the gates and member having the pockets, said pockets all being in communication with one another, said irregular surface being formed so that the combined volume of the pockets between the gates and irregular surface remains constant throughout the operation of the apparatus.

15. In combination, a hollow member, a rotary member within said hollow member, one of said members having a cylindrical surface concentric with the axis of rotation of said rotary member, and the other having an irregular surface, contacting with the cylindrical surface at equally spaced intervals about the periphery thereof, and spaced from said cylindrical surface between localities of contact to form similar recesses, a number of pockets in said member having the cylindrical surface, gates eccentrically pivoted to said member having the cylindrical surface and adapted to swing toward said irregular surface to vary the volume of said pockets, said gates being movable toward said irregular surface through centrifugal force, means acting on said gates to hold said gates away from said irregular surface and means for bringing said pockets into communication with one of said recesses.

16. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface, means forming an unrestricted bypass between said first named chamber and said pocket, and time delayed means for closing said bypass.

17. In combination, a hollow member, a rotary member within said hollow member, one of said members having a regular surface of revolution concentric with the axis of rotation of said rotary member, and the other having an irregular surface partially contacting with and partially separated from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface being formed with a pocket into which said gate extends, means forming a constricted passageway communicating with said first named chamber and said pocket for subjecting said gate to the pressure in said first named chamber to move the gate against said irregular surface, means forming an unrestricted bypass adapted to be closed when the relative movement of said members produces pressure in said first named chamber, and means operated upon reversal of relative movement of said members for opening said bypass, said means forming a dashpot for timing the closing thereof.

18. In combination, a hollow member, a rotary member within said hollow member, said inner member having a regular surface of revolution concentric with the axis of rotation of said rotary member, and said outer member having an irregular surface partially contacting with and partially spaced from said regular surface to leave a recess therebetween, a movable gate carried by the member having the regular surface and formed with a contact surface adapted to contact with the irregular surface to form in said recess two chambers on opposite sides of said gate, the volume of one of said chambers decreasing and the volume of the other chamber increasing upon relative movement of said members in one direction, said chambers having a fluid therein, said gate being movable toward said irregular surface and at certain speeds fitting loosely against said irregular surface to form a leakage passageway between said gate and irregular surface and connecting said chambers, said member having the regular surface of revolution being provided with a pocket into which the gate is snugly received and in which the gate is movable in the manner of a piston, a spring for urging said gate away from said irregular surface, and means forming a passageway between said pocket and one of said chambers by means of which fluid is admitted into said pocket for the purpose of urging the gate toward said irregular surface and against the action of said spring.

19. In combination, a hollow member, a rotary member within said hollow member, one of said members having a cylindrical surface concentric with the axis of rotation of said rotary member, and the other having an irregular surface contacting with the cylindrical surface at equally spaced intervals about the periphery thereof, and spaced from said cylindrical surface between localities of contact to form similar recesses, a number of pockets in said member having the cylindrical surface, gates movable in said pockets and adapted to follow said irregular surface to vary the volume of the pockets between the gates and member having the pockets, said pockets all being in communication with one another, means for bringing said pockets into communication with said recesses, said irregular surface being formed so that the diameter of the irregular surface taken through any locality of contact is the same regardless of the relative position of said members, whereby the combined volume of said pockets remains constant.

20. In combination, a hollow member, a rotary member within said hollow member, one of said members having a regular surface of revolution concentric with the axis of rotation of said rotary member, and the other having an irregular surface partially contacting with and partially spaced from said regular surface to leave a recess therebetween, movable piston means carried by the member having the regular surface and formed with a contact surface adapted to contact with the irregular surface to form in said recess two chambers on opposite sides of said piston means, the volume of one of said chambers decreasing and the volume of the other chamber increasing upon relative movement of said members in one direction, said chambers having a fluid therein, said piston means being movable toward said irregular surface and at certain speeds fitting loosely against said irregular surface to form a leakage passageway between said piston means and irregular surface and connecting said chambers, means responsive to the pressure in said first named chamber for urging said piston means against said irregular surface to reduce the leakage from one chamber to the other, and means for subjecting said last named means to the pressure in one of said chambers.

21. In combination, a hollow member, a rotary member within said hollow member, one of said members having a regular surface of revolution concentric with the axis of rotation of said rotary member, and the other having an irregular surface partially contacting with and partially spaced from said regular surface to leave a recess therebetween, movable piston means carried by the member having the regular surface and formed with a contact surface adapted to contact with the irregular surface to form in said recess two chambers on opposite sides of said piston means, the volume of one of said chambers decreasing and the volume of the other chamber increasing upon relative movement of said members in one direction, said chambers having a fluid therein, said piston means being movable toward said irregular surface and at certain speeds fitting loosely against said irregular surface to form a leakage passageway between said piston means and irregular surface and connecting said chambers, means for urging said piston means away from said irregular surface to increase leakage therebetween, and means responsive to the pressure in said first named chamber for urging the piston means against said surface to reduce leakage past the same.

22. In combination, a hollow member, a rotary member within said hollow member, one of said members having a regular surface of revolution concentric with the axis of rotation of said rotary member, and the other having an irregular surface partially contacting with and partially spaced from said regular surface to leave a recess therebetween, movable piston means carried by the member having the regular surface and formed with a contact surface adapted to contact with the irregular surface to form in said recess two chambers on opposite sides of said piston means, the volume of one of said chambers decreasing and the volume of the other chamber increasing upon relative movement of said members in one direction, said chambers having a fluid therein, said piston means being movable toward said irregular surface and at certain speeds fitting loosely against said irregular surface to form a leakage passageway between said piston means and irregular surface and connecting said chambers, a spring for urging said piston means away from said irregular surface to increase leakage therebetween, and means responsive to the pressure in said first named chamber for urging the piston means against said surface to reduce leakage past the same.

23. In combination, a hollow member, a rotary member within said hollow member, said inner member having a regular surface of revolution concentric with the axis of rotation of said rotary member, and said outer member having an irregular surface partially contacting with and partially spaced from said regular surface to leave a recess therebetween, movable piston means carried by the member having the regular surface and formed with a contact surface adapted to contact with the irregular surface to form in said recess two chambers on opposite sides of said piston means, the volume of one of said chambers decreasing and the volume of the other chamber increasing upon relative movement of said members in one direction, said chambers having a fluid therein, said piston means being movable toward said irregular surface and at certain speeds fitting loosely against said irregular surface to form a leakage passageway between said piston means and irregular surface and connecting said chambers, a spring for urging said piston means away from said irregular surface, and means responsive to the pressure in said first named chamber for urging said piston means against said irregular surface in opposition to said spring.

24. In combination, a hollow member, a rotary member within said hollow member, one of said members having a regular surface of revolution concentric with the axis of rotation of said rotary member and the other having an irregular surface partially contacting with and partially separated from the regular surface at a predetermined number of localities about the circumference of the surface of revolution to leave a plurality of recesses therebetween, a number of piston devices carried by the member having the regular surface, there being a different number of devices than of recesses, said devices being formed with contact surfaces adapted to contact with the irregular surface to form in said recesses chambers on opposite sides of said devices, the volume of said chambers on one side of said devices decreasing and the volume of the other chambers increasing upon relative movement of said members in one direction, said chambers having a fluid therein, said devices being movable toward said irregular surface and at certain speeds fitting loosely against said irregular surface to form leakage passageways between said devices and the irregular surface and connecting said chambers, and means responsive to the pressure in said first named chamber for urging said devices against the irregular surface to reduce the leakage from one set of chambers to the other.

25. In combination, a hollow member, a rotary member within said hollow member, one of said members having a regular surface of revolution concentric with the axis of rotation of said rotary member, the other having an irregular surface partly contacting with and partly spaced from said regular surface to leave a recess therebetween, movable means carried by the member having the regular surface and forming in said recess a high pressure chamber and a low pressure chamber, said chambers having a fluid therein, said movable means being subjected to the pressure in said high pressure chamber and controlling the flow of fluid from said high pressure chamber to the low pressure chamber in response to the pressure in the high pressure chamber.

STERLING O. STAGEBERG.